United States Patent

[11] 3,598,455

| [72] | Inventor | Schmitz, Albert A. |
| | | 5217 Durand Ave., Racine, Wis. 53406 |
| [21] | Appl. No. | 837,278 |
| [22] | Filed | June 27, 1969 |
| [45] | Patented | Aug. 10, 1971 |

[54] HYDROSTATIC BEARING SYSTEM
12 Claims, 6 Drawing Figs.

[52] U.S. Cl. .................................................. 308/9,
184/5, 308/122, 418/31
[51] Int. Cl. ................................................ F16c 35/00
[50] Field of Search ........................................ 184/5;
308/5, 9, 122; 103/120 PA; 418/31

[56] References Cited
UNITED STATES PATENTS
| 2,538,194 | 1/1951 | Ferris | 103/120 |
| 2,724,339 | 11/1955 | O'Connor et al. | 103/120 |
| 2,755,740 | 7/1956 | McKean | 103/120 X |
| 2,873,683 | 2/1959 | Sherwood | 308/9 X |
| 2,968,287 | 1/1961 | Creighton | 92/156 |
| 3,359,613 | 12/1967 | Rye | 308/9 |

*Primary Examiner*—Manuel A. Antonakas
*Attorney*—Hume, Clement, Hume and Lee

ABSTRACT: A hydrostatic balancing and lubrication system for birotational pumps and motors which utilizes check valves in the passages supplying hydrostatic bearing ares with metered amounts of pressurized fluid. The check valves prevent the backflow of fluid from the bearing areas to that one of alternate sources of fluid having the lower pressure.

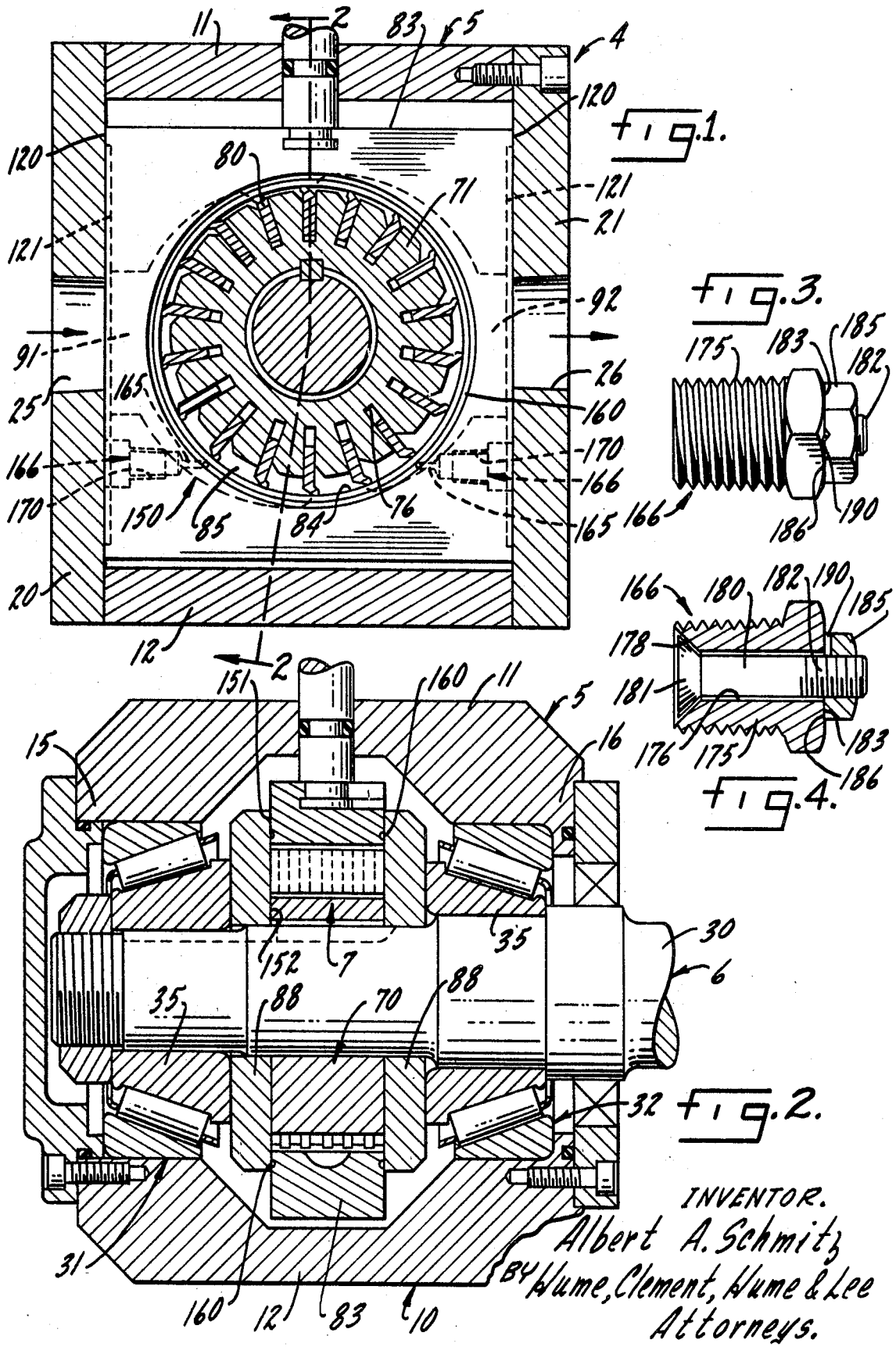

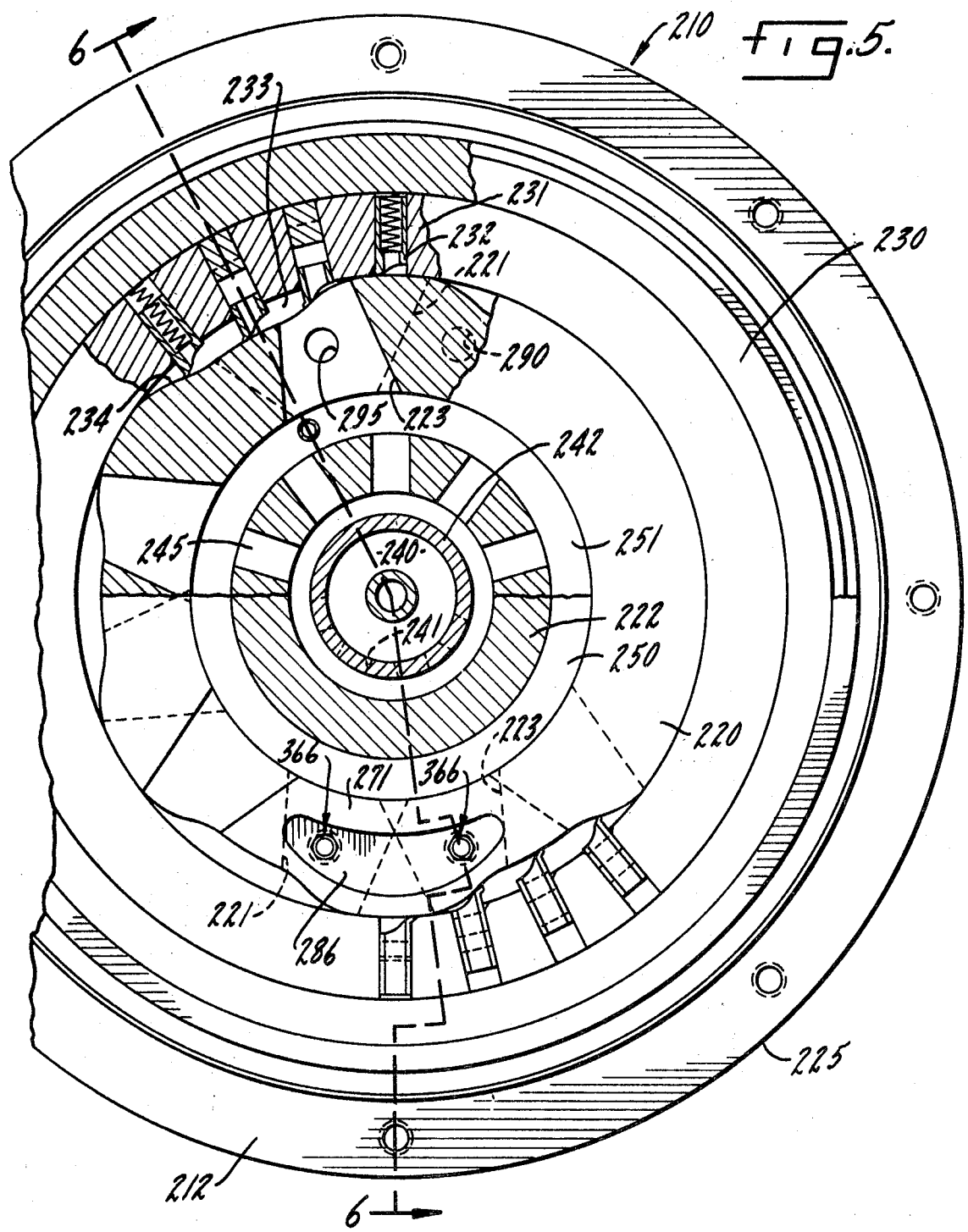

HYDROSTATIC BEARING SYSTEM

BACKGROUND OF THE INVENTION

This invention is generally in the field of fluid devices. It relates particularly to hydrostatic pressure balancing and lubrication of rotating components, and more specifically to the application of these principles in vane-type fluid pumps and motors.

Hydrostatic lubrication is, in itself, well known. As pointed out by Dudley D. Fuller in his article *Hydrostatic Lubrication*, Machine Design Magazine, June 1947, pages 110—116, the 1878 Industrial Exposition in Paris, France saw the appearance of one of the first examples of the application of hydrostatics to load carrying, antifriction devices. The article goes on to discuss hydrostatic lubrication in some detail. A later article in Machine Design, Mar. 1955, *Practical Design Applications for Hydrostatic Lubrication* by T. L. Cory and E. M. Kipp, pages 189—196, further discusses applications of this type of lubrication.

Although hydrostatic lubrication is, in itself, well known, its practical applications have heretofore been limited. In the field of fluid motors and pumps, for example, hydrostatic bearings have not been used with any degree of effectiveness.

SUMMARY OF THE INVENTION

The present invention is generally concerned with improved applications of hydrostatics to pressure balancing of relatively rotatable components and, collaterally, their lubrication. As such, it is an object of the invention to provide a new and improved hydrostatic system for pressure balancing and lubricating such components in a fluid device. It is another object to provide a new and improved hydrostatic system of the aforedescribed character incorporating fluid-metering means which serve to maintain a substantially constant hydrostatic pressure at the bearing surfaces. It is yet another object to provide such a hydrostatic system which constantly balances a stator between bracketing rotor bearing surfaces. It is still another object to provide a system of the aforedescribed character which finds particularly advantageous application in the vane-type fluid pumps and motors.

The foregoing and other objects are realized in accord with the invention by providing an annular groove or series of shallow cavities on each of the opposite side bearing surfaces of the nonrotatable casing of cam ring in the pumping cartridge of a vane-type fluid pump or motor, or the internal stator ring in an alternative form of such device. The grooves or cavities are connected to a source of fluid under pressure through meter means and check valve means. The grooves or cavities encircle each end of the casing or ring and receive fluid under pressure from the pressure side of the device, regardless of the direction in which the device is pumping or being driven. The meter and check valve means permit a metered flow of fluid under pressure to each of the grooves or cavities. The flow of fluid under pressure from the grooves or cavities is prevented.

Fluid under pressure in the grooves or cavities centers the intermediate cam ring or stator between bracketing rotating components. At the same time, this fluid under pressure assures substantially uniform lubrication between relatively rotatable surfaces.

BRIEF DESCRIPTION OF THE DRAWINGS

The invention, including its construction and method of operation, together with other objects and advantages thereof, is illustrated more or less diagrammatically in the drawing, in which:

FIG. 1 is a side elevational view, partially in section, of a vane-type fluid pump incorporating a hydrostatic balancing and lubricating system embodying features of the present invention;

FIG. 2 is a sectional view taken along line 2–2 of FIG. 1;

FIG. 3 is an enlarged plan view of a meter and check valve unit in the lubrication system of the invention;

FIG. 4 is a longitudinal sectional view taken through the meter and check valve unit of FIG. 3;

FIG. 5 is a sectional view through a wheel fluid motor assembly for a vehicle drive wheel.

DESCRIPTION OF THE PREFERRED EMBODIMENT

Figure 6:
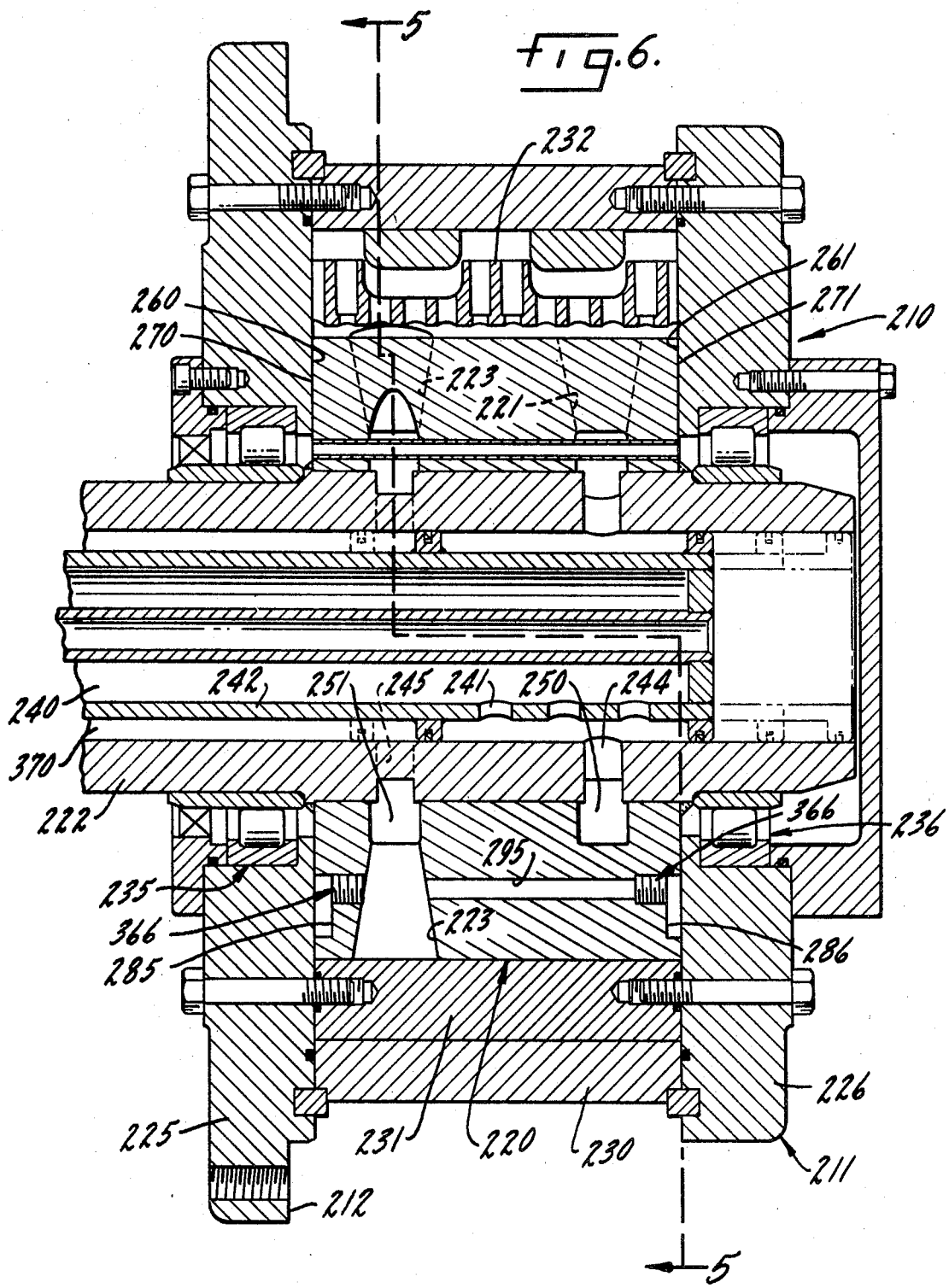
FIG. 6 is a sectional view taken along line 6–6 of FIG. 5.

Referring now to the drawings, and particularly to FIGS. 1 and 2, a vane-type fluid pump is illustrated generally at 4. The pump 4 includes a housing assembly 5 which contains a drive assembly 6 and a pumping cartridge 7.

The housing assembly 5 comprises a body 10 having an upper wall 11 and a lower wall 12 formed unitarily with an annular front wall 15 and rear wall 16. Removable side walls 20 and 21 are secured to the body member 10 by conventional machine screws. A fluid inlet-outlet portion 25 is formed in the side wall 20 while another fluid inlet-outlet port 26 is formed in the sidewall 21.

The pumping cartridge 7 is rotatably mounted within the housing assembly 5 on the drive shaft 30 of the drive assembly 6. The shaft 30 is rotatably driven by a prime mover such as a motor (not shown). The shaft 30 is rotatably mounted in the housing assembly 5 on substantially identical rotor bearing assemblies 31 and 32 at the front and rear of the body 10.

The pumping cartridge 7 is disposed between and bracketed by the inner bearing races 35 of the bearing assembly 31 and 32. The cartridge 7 includes a rotor assembly 60 mounted on the shaft 30 for rotation therewith. The rotor assembly 70 includes a rotor disc 71 keyed to the shaft 30 in a conventional manner. Radially disposed in the annular periphery of the rotor disc 71 are a plurality of evenly spaced vane receiving slots 76 in which vanes 80 are slidably mounted.

The pumping cartridge 7 further includes a casing or cam ring 83 encircling the rotor disc 71 and the radially extending vanes 80. The casing 83 defines a generally circular bore 84 in which the rotor assembly 71 is mounted for rotation. The bore 84 has a diameter substantially larger than the diameter of the rotor disc 71 and, accordingly, a chamber 85 is defined between the bore 84 surface and the outer periphery of the disc 71.

Enclosing this chamber 85 and retaining the vanes 80 in the slots 86, which extend transversely through the width of the rotor disc 71, are bracketing rotatable sideplates 88. The sideplates 88 act as bearing plates between which the cam ring 83 is vertically slidable. The plates 88 form the sides of the pumping cartridge 7 and are retained in this relationship by abutment with the inner bearing races 35. They rotate with the rotor disc 71 in a well-known manner.

Formed in the casing 83 on opposite sides thereof, in registry with the inlet-outlet ports 25 and 26 through the sidewalls 20 and 21, respectively, and the bore chamber 85, are inlet-outlet chambers 91 and 92. During operation of the pump 4 in the configuration illustrated in the FIG. 1, fluid is drawn in the inlet-outlet port 26, through the inlet-outlet chamber 92, and driven out the inlet-outlet chamber 91 through the inlet-outlet port 25 in a well-known manner. As will be readily understood, however, the position of the casing 83 relative to the axis of the shaft 30, and, accordingly, the axis of rotation of the rotor assembly 70, determines both the direction of the fluid flow and the volume of the pump 4 in operation.

The casing 83 is vertically slidable on its end bearing faces 120 between the sidewalls 20 and 21 of the housing assembly 5. Each bearing face 120 has a shallow rectangular recess 121 formed therein. During operation of the pump 4, these recesses 121 are pressurized with liquid under pressure equal to the pressure in the corresponding inlet-outlet chamber 91, 92. Hydrostatic lubrication is effected to counteract excessive friction between the casing 83 and the sidewalls 20 and 21.

As has been pointed out, the casing 83 is also vertically slidable between the bracketing bearing plates 88. Further-more, the plates 88 rotate with the rotor assembly 71 relative to the casing. It is, of course, critically important that a predetermined optimum clearance be maintained between relatively rotating parts; in this case, the casing 83 and plates 88. If, as in the present illustration, it is determined that 0.001 inch is the proper clearance, than the casing 83 is made 0.002 inch narrower than the rotor assembly 71.

Unfortunately, as pressurized fluid inside the casing 83 is forced out through these clearances, the tendency is for all of the clearance to form on one side and cause metal-to-metal contact on the opposite side. As will hereinafter be discussed, a hydrostatic centering and lubrication system 150 embodying features of this invention forestalls this unbalancing, centers the casing 83 and uniformly lubricates rotating surfaces.

The hydrostatic system 150 provides lubrication between the side bearing surfaces 151 of the casing 83 and the opposed bearing surfaces 152 on the rotating plates 88. A substantially constant pressure level of hydrostatic lubrication is maintained at the surfaces 151, 152, by the system 150, regardless of the direction in which the pump 4 is pumping fluid under pressure. At the same time, the system 150 maintains the casing 183 in centered relationship, with a 0.001 inch gap on each side.

The system 150 embodying features of the invention includes an annular grooves 160 formed in each surface 151 of the casing 83 immediately adjacent to and encircling the bore 84 through the casing. Each groove 160 is identical in configuration; it might be square, rectangular, or curved in cross section. In the drawing illustration, it is segmentally circular in cross section. As illustrated, the grooves are 0.065 inch deep and 0.125 inch wide at the corresponding surfaces 151.

Each groove 160 is afforded fluid communication with each recess 121 in a corresponding end bearing face 120 of the casing 83 through an L-shaped fluid passage 165 and a meter and check valve unit 166. Each L-shaped passage 165 extends from communication with a corresponding groove 160, perpendicular to the bearing surfaces 151, to a point in the body of the casing where it turns at right angles and extends toward a corresponding end bearing face 120 through a threaded bore 170 in which a flow meter and check valve unit 166 is mounted.

A flow meter and check valve 166 is illustrated in substantial detail in FIGS. 3 and 4. Each of the four units 166 in the system 150 is identical and includes an externally threaded collar 175 which is adapted to be threaded into the bore 170. Extending axially through the collar 175 is a circular cylindrical passage 176. At its inner end, the passage 176 is countersunk to form a frustoconical valve seat 178.

Extending through the bore 176 is a conventional machine bolt 180 having a frustoconical head 181 conforming in shape to the frustoconical valve seat 178. The bolt extends to a threaded end 182 which protrudes from the collar 175 at its flat end face 183.

Threaded onto the end 182 of the bolt 180 is a nut 185. The flat inner face 186 of the nut 185 is adapted to seat smoothly against the corresponding flat face 183 of the collar 175.

A single meter notch 190 is formed on the inner face 186 of the nut 185. With the face 186 of the nut 185 seated snugly against the face 183 on the collar 175, the meter notch 190 permits fluid to flow through it at a predetermined rate under a given pressure.

During normal operation of the pump 4, with fluid under pressure being pumped from the inlet-outlet chamber 91 through the outlet port 25, this outlet pressure is effective in the recess 121 of the corresponding end bearing face 120 of the casing 83. Liquid under such pressure is metered through the meter notch 190, along the passage 176 surrounding the bolt 180, and past the frustoconical head 181 on the bolt into the L-shaped passage 165. This fluid under pressure is effective in the groove 160 to provide a hydrostatic bearing effect for rotation of bearing plates 88 on casing 83.

When the pressure in the groove 160 is higher than that in a recess 121 on an end bearing face 120 of the casing 83, as it would be relative to pressure in the recess 121 adjacent the inlet-outlet port 26 and the inlet-outlet chamber 92 of the pump 4 in its illustrated operating configuration, the groove pressure effective on the bolt head 181 of the bolt 180 in the corresponding unit 166 forces the frustoconical head 181 into seated relationship on the valve seat 178. Flow of lubricating fluid under pressure from the groove 160 to the inlet, or low-pressure side of the pump 4 id thus prevented.

It will thus be seen that regardless of the direction in which the pump 4 is pumping liquid, a substantially constant, predetermined hydrostatic lubrication pressure is maintained in the grooves 160 on each bearing face 151 of the casing 83. As a result, bearing plates 88 rotate with precisely the same degree of freedom on the casing 83 in the pump 4 for a long, maintenance-free service life.

At the same time that lubrication of the opposed bearing surfaces 151 and 152 of the casing 83 and the corresponding plates 88 is maintained, the system 150 maintains the 0.001 inch gap between these surfaces. As the casing 83 tends to shift offcenter, one clearance gap increases and the other closes. As one gap closes, the flow out of its pressurized groove 160 between corresponding surfaces 151, 152 is reduced and pressure builds up while, at the same time, as the opposite gap opens, flow out of its groove increases and pressure in the groove decreases due to the restricted metering effect of the inlet notch 190. The change in pressure in opposing grooves 160 immediately corrects the drift offcenter and recenters the casing 83.

Turning now to FIGS. 5 and 6 of the drawings, the invention is illustrated in a slightly different concept. FIGS. 5 and 6 disclose the fluid motor concept applied to a vehicle drive wheel. The motor is seen generally at 210 and includes wheel drum 211 on which a drive wheel for a conventional vehicle, a tractor, for example, would be mounted against the flange 212.

The motor 210 forms no specific part of the present invention and, accordingly, it is not described in detail. Generally, however, the motor 210 includes a motor stator disc 220 mounted on and encircling a hollow axle 222. The stator 220 is rigidly mounted on the annular periphery of the fixed axle 222.

The wheel drum 211 forms the rotor of the motor 210. The drum 211 includes an inner plate 225 and an outer plate 226 which bracket the motor stator 220. An annular casing 230 encircles the stator 220 and connects the plates 225 and 226 in fluidtight relationship. An annular linear ring 231 is fixed inside the casing 230 and slidably mounts radially disposed drive vanes 232. Fluid chambers 233, into which the vanes 232 extend, are defined between the scalloped outer periphery 234 of the stator disc 220 and the ring 231.

The drum 211 rotates on an inner roller bearing assembly 235 and an outer roller bearing 236 suitably seated on the hollow axle 222. The drum 211 is driven in a predetermined direction around the axle 222 and the stator 220 by fluid under pressure supplied by a suitable pump source (not shown) through the axle passage 240, radially disposed apertures 241 in the inner sleeve 242 forming the axle passage 240, radially disposed ports 244 in the axle 222 itself, and the annular channel 250 in the motor stator 220. Fluid under pressure is delivered through radially formed passageways 221 in the stator 220 to the motor chambers 233 where it is effective on the radially disposed, hollow vanes 232 to drive the drum 211 about the axis 222.

The precise manner in which fluid under pressure is directed to the chambers 233 and effective on the vanes 232 to rotate the drum 211 in either direction about the stator 220 is not significant to the present invention. Accordingly, as has been pointed out, it is not described in detail. As the drum 211 rotates on bearing assemblies 235 and 236 about the axle 222 and the stator 220, however, the planar inner surfaces 260 and 261 of the bracketing rotor plates 225 and 226, respectively, are maintained in predetermined spaced relationship with the opposing side surfaces 270 and 271, respectively, of the rotor disc 220 by the hydrostatic balancing and lubricating system 280 embodying features of the invention.

It will be recognized that in the application of a fluid motor to a vehicle drive wheel, the high forces applied axially to one side of the wheel as the vehicle is cornering or working on a hillside can cause normal lubrication between the surface 260, 270 and 261, 271, to break down, locally, on one side or the other of the stator 220. The normal spacing between such surfaces 260, 270, and 261, 271, approximately 0.001 inch in the present instance, is violently decreased in one area by such forces, while it increases in a corresponding area on the opposite side of the stator disc 220. The balancing and lubrication system of the present invention effectively forestalls such unbalancing or offcenter relationship of the drum or rotor 211 on the stator 220, thus avoiding localized metal-to-metal contact on the surfaces 260, 270 and 261, 271. Less maintenance problems and a longer service life results, as would be expected.

The balancing and lubrication system includes a serial of roughly kidney-shaped recesses 285 formed in annularly spaced relationship on the surface 270 of the stator 220, and an identical series of such recesses 286 formed in the opposite surface 271 of the stator. In the present instance, six of such recesses 185 are formed in the surface 270, and an identical series of six such recesses formed in the opposite face 271 also.

Each opposed pair of generally kidney-shaped recesses 285 and 286 are joined by two transversely disposed fluid passages 290 and 295 in the stator disc 220. Such transversely extending fluid passages 290 and 296 are, in turn, joined by the radially extending passages 221 and 223 to the annularly formed channels 250 and 251 in the disc 220 and, in turn, connected to radial ports 244 and 245 in the axle 222. The port 245 is in communication with passages 370 and the port 244 is in communication with the passage 240 through the apertures 241.

Disposed at the connection between each transverse passage 290 or 295 and its corresponding recesses 285 and 286 is a flow meter and check valve 366 identical in construction and operation to the valve 166 illustrated in detail in FIGS. 3 and 4. Each flow meter and check valve 366 permits the metered flow of fluid under pressure from an annular groove 250 or 251 through the passages 221 and 290 or 223 and 295 into the recesses 285 and 286, while checking the flow of fluid under pressure out of the recesses. Since the details of construction and operation of the flow meter and check valve 166 have been described, the flow meter and check valve 366 are shown only in representative, "black box" relationship.

During normal operation of the fluid motor 210, fluid under pressure is pumped to the annular channel 250 in the stator disc 220 and this fluid under pressure is effective to drive the rotor or drum 211 about the stator. The spent fluid returns through the other annular channel 251 to a return channel 370. If the wheel is to be driven in the opposite direction about the axle 222, the flow of fluid to the channels 250 and 251 is reversed. Regardless, fluid under pressure is always available to the recesses 285 and 286 through the metering and check valve units 366.

In operation of the fluid motor driven wheel, as localized side forces are applied to the wheel, the ideal clearance gap, in the area of the highest force concentration on that side of the wheel, tends to narrow or be reduced. Pressurized fluid in certain of the recesses 286, for example, if the force is from the outside of the wheel, cannot readily escape through the smaller clearance gap between surfaces 261 and 271. Pressure tends to build up in these recesses 286. At the same time, because the gap between the surfaces 260 and 270 on the opposite side of the wheel begins to grow larger, or widen, fluid under pressure can more readily escape certain of these recesses 285 and the pressure in these recesses drops. This is due to the fact that the metering and check valve unit 366 limits the influx of fluid under pressure to these recesses.

Accordingly, the increased pressure in the recesses 286 and the decreased pressure in the recesses 285, opposite each other in the area of the localized side forces, immediately balances or recesses the drum 211 on the stator 220. The ideal gap is maintained on both sides and uniform lubrication assured.

While several embodiments described herein are at present considered to be preferred, it is understood that various modifications and improvements may be made therein.

What I desire to be claimed and secured by Letters Patent of the United States is:

1. A hydrostatic system for a fluid device, comprising:
   a. a fluid pressure means,
   b. a bearing surface,
   c. depression means formed in said bearing surface,
   d. fluid passage means between said depression means and said fluid pressure means, and
   e. meter means and check valve means disposed in said fluid passages means between said fluid pressure means and said depression means for permitting metered flow of fluid under pressure from said fluid pressure means to said depression means while preventing the flow of fluids from said depression means to said fluid pressure means.

2. A hydrostatic system for a fluid device, comprising:
   a. a fluid pressure means,
   b. a bearing surface,
   c. depression means formed in said bearing surface,
   d. fixed volume fluid passage means between said depression means and said fluid pressure means, and
   e. meter means and check valve means disposed in said fluid passage means between said fluid pressure means and said depression means for permitting metered flow of fluid under pressure from said fluid pressure means to said depression means while preventing the flow of fluid from said depression means to said fluid pressure means.

3. A hydrostatic balancing and lubrication system for a hydraulic pump or motor or the like, comprising:
   a. a stator and a rotor,
   b. opposed bearing surface means between said stator and rotor on opposite sides thereof,
   c. fluid pressure means,
   d. depression means formed in said bearing surface means on at least one of said stator and rotor,
   e. fluid passage means connecting said depression means with said fluid pressure means, and
   f. meter means and check valve means disposed in said passage means for permitting the metered flow of fluid under pressure from said fluid pressure means to said depression means while preventing the flow of fluid from said depression means to said fluid pressure means.

4. The hydrostatic balancing and lubrication system of claim 3 further characterized in that:
   a. said meter means and valve means are unitary and comprise a valve body having a valve bore extending therethrough,
   b. a first valve seat formed in said body at one end of said bore and a second valve seat formed in said body at the opposite end of said bore,
   c. a valve member movable in said bore and having a first valve head adapted to seat against said first valve seat in sealing relationship to stop fluid flow from said depression means and a second valve head adapted to seat against said second valve seat in such relationship that metered flow of fluid under pressure to said depression means is permitted.

5. The hydrostatic balancing and lubricating system of claim 4 further characterized in that:
   a. said first valve seat and said first valve head have complementary frustoconical sealing surfaces.

6. The hydrostatic balancing and lubrication system of claim 5 further characterized in that:
   a. at least one of said second valve seat and said second valve head have groove means formed therein to permit said metered flow.

7. A hydrostatic balancing and lubrication system for a reversible flow, vane-type hydraulic pump or motor, comprising:
   a. a stator and a rotor, b. opposed bearing surfaces means between said stator and rotor on opposite sides thereof,
c. fluid pressure means including an inlet and an outlet means,
d. depression means formed in said bearing surface means on at least one of said stator and rotor,
e. first fluid passage means connecting said depression means with the fluid pressure inlet means and second fluid passage means connecting said depression means with the fluid pressure outlet means, and
f. meter means and check valve means disposed in said passage means for permitting metered flow of fluid under pressure from said fluid pressure inlet means to said depression means while preventing the flow of fluid under pressure from said depression means to said fluid pressure outlet means.

8. The hydrostatic balancing and lubrication system of claim 7 further characterized in that:
a. said meter means and said valve means are unitary and comprise a valve body having a valve bore extending therethrough,
b. a first valve seat formed in said body at one end of said bore and a second valve seat formed in said body at the opposite end of the said bore,
c. a valve member movable in said bore and having a first valve head adapted to seat against said first valve seat in sealing relationship to stop fluid flow from said depression means and a second valve head adapted to seat against said second valve seat in such relationship that metered flow of fluid under pressure to said depression means is permitted.

9. The hydrostatic balancing and lubrication system o claim 9 further characterized in that:
a. said first valve seat and said first valve head have complementary, frustoconical sealing surfaces.

10. The hydrostatic balancing and lubrication system of claim 9 further characterized in that:
a. at least one of said second valve seat and said second valve head have groove means formed therein to permit said metered flow.

11. A hydrostatic system for a fluid device, comprising:
a. fluid pressure means,
b. a bearing surface,
c. depression means formed in said bearing surfaces,
d. direct fluid passage means between said depression means and said fluid pressure means, and
e. meter means and check valve means disposed in said fluid passage means between said fluid pressure means and said depression means for permitting metered flow of fluid under pressure from said fluid pressure means to said depression means while preventing the flow of fluid from said depression means to said fluid pressure means.

12. A hydrostatic balancing and lubrication system for a hydraulic pump or motor or the like, comprising:
a. a stator and a rotor,
b. opposed bearing surface means between said stator and rotor on opposite sides thereof,
c. alternate fluid pressure means,
d. a plurality of depressions in said bearing surface means,
e. separate fluid passage means connecting each of said depression means with each of said alternate fluid pressure means, and
f. meter means and check valve means disposed in each of said fluid passage means for permitting metered flow of fluid under pressure from one of said fluid pressure means to said depression means while preventing the flow of fluid from said depression means to other said alternate fluid pressure means.

UNITED STATES PATENT OFFICE
CERTIFICATE OF CORRECTION

Patent No. 3,598,455  Dated August 10, 1971

Inventor(s) Albert A. Schmitz

It is certified that error appears in the above-identified patent and that said Letters Patent are hereby corrected as shown below:

In the Abstract, line 3, change "ares" to --areas--

Column 1, line 73, "lubricating" should be --lubrication--

Column 2, line 19, "portion" should be --port--

Column 4, line 8, change "id" to --is--.
Column 3, Line 23, change "183" to --83--;
          Line 26, change "grooves" to --groove--;
          Line 67, "of" should be --on--.

Column 4, line 46, change "linear" to --liner--
          Line 63, change "axis" to --axle--

Column 5, line 4, change "surface" to --surfaces--
          Line 22, "185" should be --285--
          Line 28, "296" should be --295
          Line 32, change "passages" to --passage--
          Line 75, change "recesses" to --recenters--

Column 6, line 15, change "passages" to --passage--

Line 63, change "lubricating" to --lubrication--

Column 7, line 32, change "o" to --of--
          Line 33, change "9" to --8--

Column 8, line 9, change "surfaces" to --surface--

Signed and sealed this 13th day of June 1972.

(SEAL)
Attest:

EDWARD M. FLETCHER, JR.
Attesting Officer

ROBERT GOTTSCHALK
Commissioner of Patents